(12) United States Patent
Sagata

(10) Patent No.: US 10,960,779 B2
(45) Date of Patent: *Mar. 30, 2021

(54) INFORMATION PROCESSING DEVICE

(71) Applicant: TOYOTA JIDOSHA KABUSHIKI KAISHA, Toyota (JP)

(72) Inventor: Koji Sagata, Ichikawa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 177 days.

This patent is subject to a terminal disclaimer.

(21) Appl. No.: 16/238,176

(22) Filed: Jan. 2, 2019

(65) Prior Publication Data
US 2019/0137273 A1 May 9, 2019

Related U.S. Application Data

(63) Continuation of application No. 13/978,636, filed as application No. PCT/JP2011/050266 on Jan. 11, 2011, now Pat. No. 10,415,972.

(51) Int. Cl.
*B60L 53/14* (2019.01)
*G06F 16/29* (2019.01)
(Continued)

(52) U.S. Cl.
CPC ............. *B60L 53/14* (2019.02); *B60L 3/12* (2013.01); *B60L 53/68* (2019.02); *G01C 21/00* (2013.01);
(Continued)

(58) Field of Classification Search
CPC ......... G01C 21/00; G01C 21/32; Y04S 30/12; Y02T 10/7291; Y02T 90/168; Y02T 90/163; Y02T 90/128; Y02T 90/162; Y02T 90/161; Y02T 90/14; Y02T 10/7005; Y02T 10/7088; Y02T 90/16; B60L 2240/622; B60L 53/14; B60L 53/68; B60L 3/12; B60L 2240/72; B60L 2250/16; B60L 2260/54; B60L 2260/52; G06F 17/3087; G06F 16/282; G06F 16/29; G06F 16/387; G06F 16/909; G06F 16/9537

See application file for complete search history.

(56) References Cited

U.S. PATENT DOCUMENTS 7,986,126 B1   7/2011  Bucci et al.
8,565,950 B2 * 10/2013  Ishibashi ............... H04L 9/3263
                                                         701/22
(Continued)

FOREIGN PATENT DOCUMENTS

JP   2001215124 A   8/2001
JP   2002062156 A   2/2002
(Continued)

*Primary Examiner* — James E Richardson
(74) *Attorney, Agent, or Firm* — Hunton Andrews Kurth LLP

(57) ABSTRACT

The present invention is an information processing device which registers in a map database, a charging point in which charging equipment is located at the time of charging of an electric vehicle, including a registration section that, in a case where the charging point is located within a facility area registered in the map database, registers in the map database, the charging point in association with positional information of the facility area.

8 Claims, 5 Drawing Sheets

(51) Int. Cl.
  *B60L 3/12* (2006.01)
  *G01C 21/32* (2006.01)
  *B60L 53/68* (2019.01)
  *G06F 16/23* (2019.01)
  *G01C 21/00* (2006.01)

(52) U.S. Cl.
  CPC ............ *G01C 21/32* (2013.01); *G06F 16/23* (2019.01); *G06F 16/29* (2019.01); *B60L 2240/622* (2013.01); *B60L 2240/72* (2013.01); *B60L 2250/16* (2013.01); *B60L 2260/52* (2013.01); *B60L 2260/54* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/12* (2013.01)

(56) References Cited

U.S. PATENT DOCUMENTS

| | | | |
|---|---|---|---|
| 8,630,526 B1* | 1/2014 | O'Neil | H04N 5/2251 386/227 |
| 2002/0133292 A1 | 9/2002 | Miyaki | |
| 2002/0165661 A1* | 11/2002 | Horikami | G01C 21/3617 701/468 |
| 2004/0166880 A1 | 8/2004 | Horikami | |
| 2009/0153362 A1* | 6/2009 | Goto | G09B 29/006 340/932.2 |
| 2010/0205218 A1* | 8/2010 | Walkling | G01C 21/32 707/797 |
| 2010/0211643 A1 | 8/2010 | Lowenthal et al. | |
| 2010/0225475 A1 | 9/2010 | Karch et al. | |
| 2011/0022222 A1* | 1/2011 | Tonegawa | B60L 50/16 700/232 |
| 2011/0025267 A1 | 2/2011 | Kamen et al. | |
| 2011/0213780 A1 | 9/2011 | Suganuma et al. | |
| 2012/0123676 A1 | 5/2012 | Seino | |
| 2012/0179323 A1 | 7/2012 | Profitt-Brown et al. | |
| 2014/0028257 A1* | 1/2014 | Nishida | B60L 53/305 320/109 |

FOREIGN PATENT DOCUMENTS

| | | | |
|---|---|---|---|
| JP | 2010101854 A | | 5/2010 |
| JP | 2010204042 A | | 9/2010 |
| JP | 2011086020 A | * | 4/2011 |
| JP | 2012132817 A | * | 7/2012 |
| WO | 2010049779 A1 | | 5/2010 |

* cited by examiner

INFORMATION PROCESSING DEVICE

CROSS REFERENCE TO RELATED APPLICATION

This is a continuation application of U.S. patent application Ser. No. 13/978,636, filed Jul. 8, 2013 which is a national phase application based on the PCT International Patent Application No. PCT/JP2011/050266 filed on Jan. 11, 2011, the entire contents of both of which are incorporated herein by reference.

TECHNICAL FIELD

The present invention relates to an information processing device which registers charging points in a map database when mobile objects are charged.

BACKGROUND ART

As a technical literature relating to this field, Patent literature 1 is known. In this publication, a charging point registration device is disclosed which registers a current position of an electric vehicle as a charging point when a charge amount at the time of restart of the electric vehicle is increased to a predetermined amount or more compared to a charge amount at the time of stop of the electric vehicle.

CITATION LIST

Patent Literature

[Patent Literature 1] Japanese Unexamined Patent Application Publication No. 2010-204042

SUMMARY OF INVENTION

Technical Problem

Incidentally, charging equipment requires a smaller installation space compared to a general gas station, and may be installed in various locations such as shopping malls and parking lots. As a result, if installation locations are diversified, it is expected that small charging equipment which is hard to find will be increased. Therefore, so as to allow users to reliably reach charging equipment, improvement in the accuracy of the positional information of the charging point is demanded.

In view of the above problem, an object of the present invention is to provide an information processing device in which accuracy of positional information of charging points to be registered in a map database can be improved.

Solution to Problem

The present invention is an information processing device which registers in a map database, a charging point in which charging equipment is located at the time of charging of a mobile object, including a registration unit that, in a case where the charging point is located within a facility area which is registered in the map database, registers in the map database the charging point in association with positional information of the facility area.

According to the information processing device relating to the present invention, in a case where the charging point is located within a facility area such as shopping malls, the charging point in association with positional information of the facility area is registered in the map database, and thus it is possible to reliably register in the map database, information as to whether or not the charging point is within the facility area, and to improve an accuracy of the positional information of the charging point.

In the information processing device relating to the present invention, it is preferable that the registration unit respectively hierarchize positional information of the facility area and the charging point into an upper level and a lower level, and registers the hierarchized data in the map database.

According to the information processing device relating to the present invention, the charging point is hierarchized and registered as information in the lower level of the positional information of the facility area, and thus it is possible to facilitate an access to the charging point from the positional information of the facility area. Therefore, according to the information processing device, the access to the charging point by the user is facilitated, and thus it is possible to shorten a search time of the charging point.

In the information processing device relating to the present invention, it is preferable that the registration unit register in the map database, the current position of the mobile object as the charging point at the time of charging.

According to the information processing device relating to the present invention, it is possible to realize efficient registration of the charging point by taking the current position of the mobile object as the charging point at the time of charging.

In the information processing device relating to the present invention, it is preferable to further include a registration prohibition determination unit that, in a case where the charging point is located within the facility area, determines whether or not the charging point is prohibited from being registered, based on a facility classification of the facility area.

According to the information processing device relating to the present invention, it is not appropriate to register in the shared map database, the position of charging equipment for home use which is provided in a general house or charging equipment dedicated for employees which is provided in a company site, and thus it is possible to prohibit the charging point from being registered in a case where the facility classification of the facility area is the general house or the like.

In the information processing device relating to the present invention, it is preferable that the registration prohibition determination unit determine that the charging point is prohibited from being registered in a case where the facility classification of the facility area is a private facility.

According to the information processing device relating to the present invention, it is not appropriate to register in a shared map database, a position of the charging equipment within the facility area, in a case where the facility classification of the facility area is set to a private facility, and thus it is possible to prohibit the charging point from being registered in a case where the facility classification of the facility area is a private facility.

It is preferable that the information processing device relating to the present invention further include a display unit that displays the positional information of the facility area and the charging point that are registered in the map database, and the display unit simultaneously display the positional information of the facility area and the charging point associated with the positional information of the facility area.

According to the information processing device relating to the present invention, since the positional information of the facility area and the charging point are simultaneously displayed, the user can know clearly that the charging point exists within the facility area, and thus it is possible to improve convenience of the user.

In the information processing device relating to the present invention, it is preferable that the display unit display the charging point associated with the positional information of the facility area, in a case where the mobile object enters within the facility area.

According to the information processing device relating to the present invention, since the charging point is displayed from when the mobile object enters within the facility area, it is possible to avoid a screen display from being complicated caused by displaying the charging point before the mobile object enters within the facility area, and thereby improving the convenience of the user.

Advantageous Effects of Invention

According to the present invention, it is possible to improve the accuracy of the positional information of the charging point.

DESCRIPTION OF EMBODIMENTS

Figure 1:
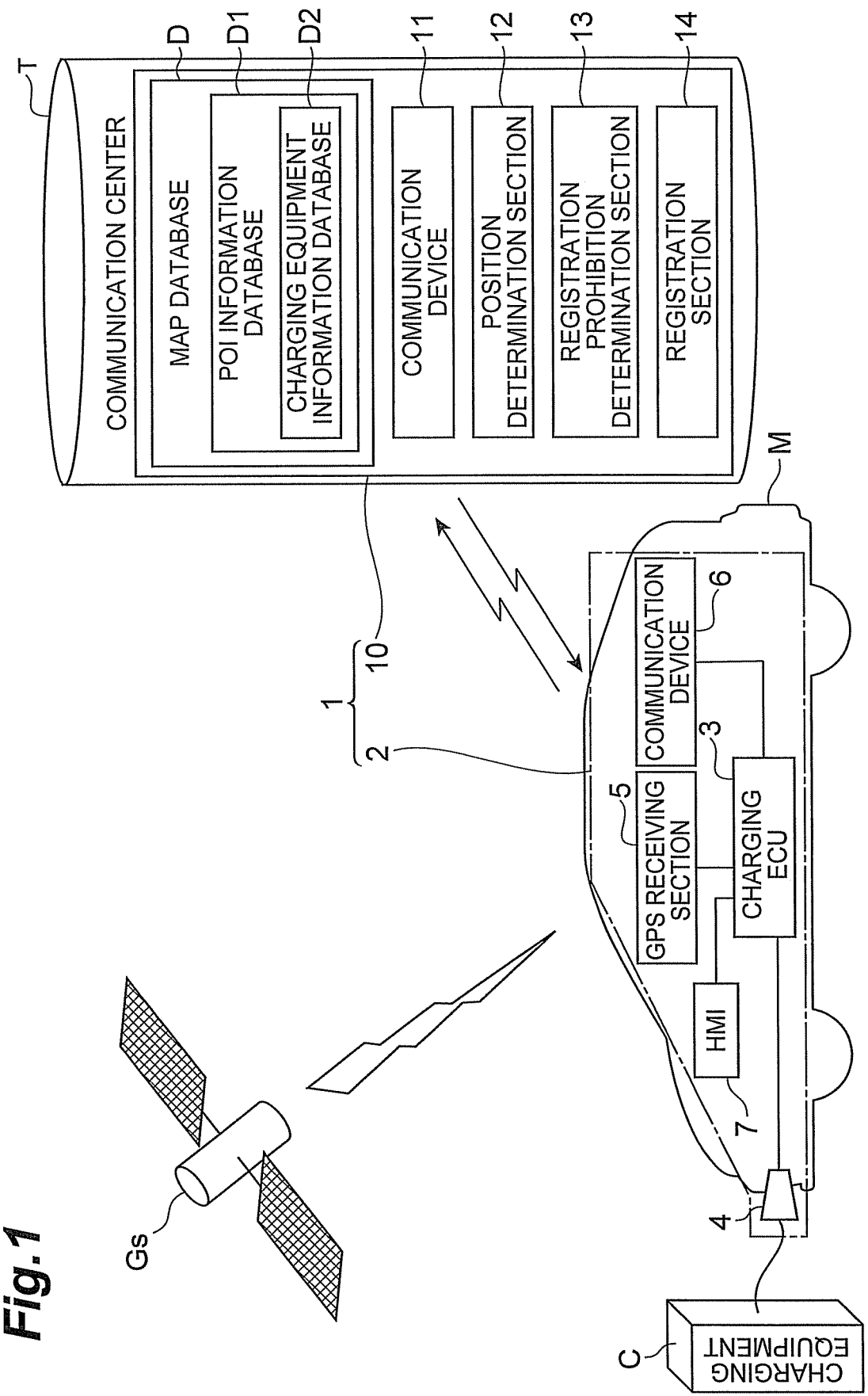
FIG. 1 is a schematic configuration diagram showing a configuration of an exemplary embodiment of an information processing device relating to the present invention.

Hereinafter, preferred embodiments of the present invention will be described in detail with reference to the drawings. Note that the same reference numerals are given to the same or equivalent parts in the drawings, and overlapping description will be omitted.

As shown in FIG. 1, the information processing device 1 according to the present exemplary embodiment transmits to a communication center T, the positional information of the charging point in which charging equipment C is located when an electric vehicle M is charged, and registers the charging point in a map database D of the communication center T.

Incidentally, the present exemplary embodiment describes a case where the map database D is provided in the communication center T, but the map database D may be provided in electric vehicle M or may be provided in information terminals such as smart phones, notebook computers and tablet computers.

Figure 2:
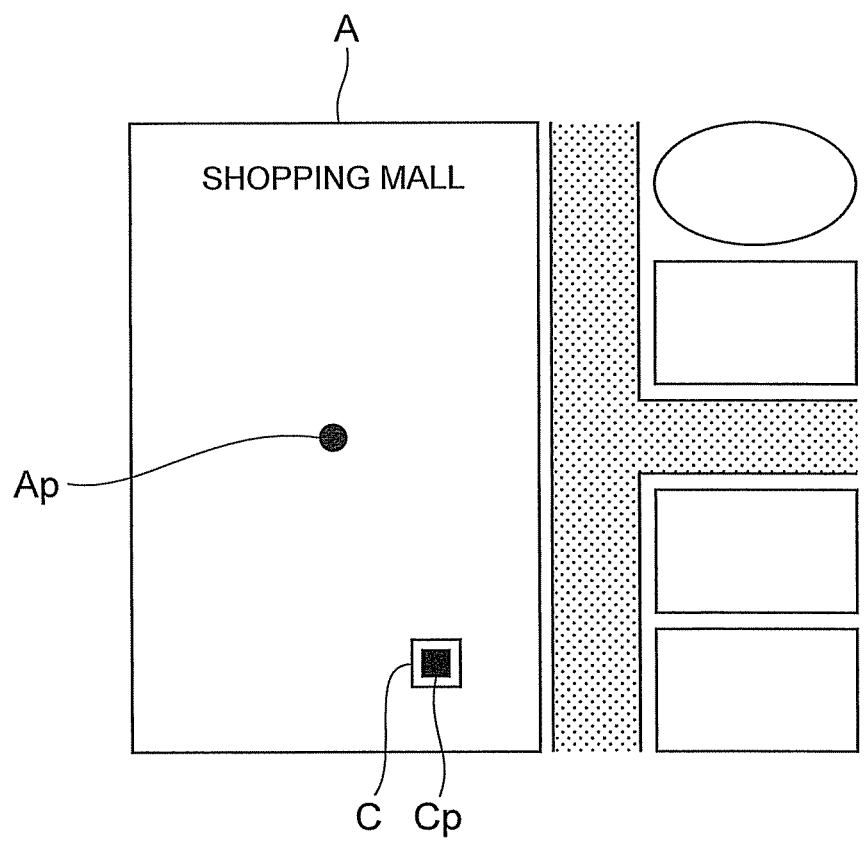
FIG. 2 is a diagram illustrating a facility area on map data.

The information processing device 1 determines whether or not the charging point transmitted from the electric vehicle M is located within facility areas such as shopping malls. Here, FIG. 2 is a diagram illustrating a facility area on map data in the map database D. In FIG. 2, A denotes a facility area of a shopping mall, and C denotes charging equipment. Further, Ap denotes a point indicated by positional information of the facility area A on the map data, and Cp denotes a charging point transmitted from the electric vehicle M.

As shown in FIG. 2, for example, the facility area A of the shopping mall is represented on the map data as a rectangular shape. This facility area A includes, for example, parking lots, passages, and other sites in addition to buildings constituting the shopping mall. The charging point Cp is located within the facility area A.

In a case where it is determined that the charging point Cp is located within the facility area A, the information processing device 1 determines whether the charging point is prohibited from being registered, based on the facility classification of the facility area A. The facility classification is a classification of types of facilities such as shopping malls, private parking lots, gas stations, general houses or factories of companies. Since it is not appropriate to register in the map database D of communication center T, the position of the charging equipment for home use in a case where the facility classification of the facility area A is the general house or the like, the information processing device 1 determines that the charging point is prohibited from being registered.

In a case where the facility classification of the facility area A is the shopping mall or the like, the information processing device 1 determines that the charging point is not prohibited from being registered. In a case where it is determined that the charging point is not prohibited from being registered, the information processing device 1 registers in the map database D, the charging point. At this time, the information processing device 1 associates and registers the charging point Cp and positional information Ap of the facility area A.

Hereinafter, a configuration of the information processing device 1 relating to the present exemplary embodiment will be described.

As shown in FIG. 1, the information processing device 1 includes a vehicle-side information processing device 2 provided in the electric vehicle M and a center-side information processing device 10 provided in the communication center T.

The vehicle-side information processing device 2 includes a charging Electronic Control Unit (ECU) 3 which performs an overall control of the device 2. The charging ECU 3 is an electronic control unit including a Central Processing Unit (CPU), a Read Only Memory (ROM), and a Random Access Memory (RAM).

The charging ECU 3 is connected to a charging equipment connecting portion 4, a Global Positioning System (GPS) receiving section 5, a communication device 6, and a Human Machine Interface (HMI) 7. The charging equipment connecting portion 4 is a portion to which a plug of the charging equipment C is connected. The plug of the charging equipment C is connected to the charging equipment connecting portion 4, and thus charging of the electric vehicle M is performed.

The GPS receiving section 5 is adapted to detect the current position of the electric vehicle M. The GPS receiving section 5 detects the current position of the electric vehicle M by using GPS signals transmitted from a plurality of GPS satellites Gs. The GPS receiving section 5 outputs the detected current position of the electric vehicle M as a current position signal to the charging ECU 3.

The communication device 6 is adapted to perform wireless communication between the vehicle-side information processing device 2 of the electric vehicle M and the center-side information processing device 10 of the communication center T. The communication device 6 performs transmission and reception of various signals with the center-side information processing device 10 through a wireless communication network.

The HMI 7 is an interface for exchanging information between the vehicle-side information processing device 2 and the user riding on the electric vehicle M. The HMI 7 includes a display that outputs image information to a user, a speaker that outputs audio information, and a touch panel and operation buttons that receive the user's operation.

The HMI 7 displays map data on the display according to the operation of the user and the current position of the electric vehicle M. The HMI 7 displays the positional information Ap of the facility area A that is registered in the map database D of the communication center T and the charging point Cp as map data, to the user. At this time, the HMI 7 simultaneously displays the positional information Ap of the facility area A and the charging point Cp associated with the positional information Ap. In this manner, since the positional information Ap of the facility area A and the charging point Cp are simultaneously displayed, the user can clearly know that the charging point Cp exists within the facility area A, and thereby it is possible to improve convenience of the user. The HMI 7 functions as a display unit described in the claims.

If the plug of the charging equipment C is connected to the charging equipment connecting portion 4 and charging of the electric vehicle M is carried out, the charging ECU 3 recognizes the start of charging from a change in a charging amount of a battery. If the start of charging is recognized, the charging ECU 3 makes a charging flag for charging point registration. In a case where the charging flag is made, the charging ECU 3 transmits the current position of the electric vehicle M detected by the GPS receiving section 5 as the positional information of the charging point, to the center-side information processing device 10 of the communication center T.

Also, if the destination of the electric vehicle M is input to the HMI 7 by the user, the charging ECU 3 acquires map data including a route from the current position to the destination through communication with the communication center T. If the destination that is input by the user is a facility area including the charging point, the charging ECU 3 automatically performs communication with a charging reservation server of the charging point, and makes a reservation of charging equipment. The automatic reservation function can be freely canceled or set by the user. If it is determined that the reservation of the charging equipment is occupied, the charging ECU 3 inquires of the user as to whether or not to search for other charging equipment. Depending on the reply from the user, the charging ECU 3 re-searches the charging equipment or sets a destination as a destination that is input by the user as it is.

Further, the charging ECU 3 determines whether or not the electric vehicle M enters within the facility area A, based on the map data acquired by wireless communication of the communication device 6 and the current position signal of the GPS receiving section 5. In a case where the electric vehicle M enters within the facility area A, when the charging point Cp associated with the positional information Ap of the facility area A is present, the charging ECU 3 causes the positional information Ap of the facility area A and the charging point Cp to be simultaneously displayed on the display of HMI 7. The charging point Cp is not displayed on the display of the HMI 7, until the electric vehicle M enters within the facility area A.

In this manner, since the charging point Cp is displayed from when the electric vehicle M enters within the facility area A, it is possible to avoid a screen display from being complicated caused by displaying the charging point Cp before the electric vehicle M enters within the facility area A, and thereby improving the convenience of the user. Incidentally, in a case where the charging point Cp is set to the destination, the charging point Cp is displayed on the display even before the electric vehicle M enters within the facility area A. Further, an aspect is possible in which the charging point Cp is displayed not when the electric vehicle M enters within the facility area A, but when the electric vehicle M approaches within a predetermined distance of the facility area A.

The center-side information processing device 10 includes a map database D that stores map information such as roads and facilities. This map database D is configured of a POI information database D1 and a charging equipment information database D2.

The POI information database D1 is a database that stores the Point Of Interest (POI) information. The POI information is facility-related information associated with information such as zip codes and phone numbers of facilities, in addition to facility names, facility classifications, and positional information of facilities. The POI information database D1 is a lower database of the map database D.

The charging equipment information database D2 is a database that stores information about the charging point that is the position of the charging equipment. Further, the charging equipment information database D2 is a lower database of the POI information database D1. In the charging equipment information database D2, the charging points is stored as lower information of the POI information in the POI information database D1.

Further, the center-side information processing device 10 includes a communication device 11, the position determination section 12, a registration prohibition determination section 13 and a registration section 14. The communication device 11 is adapted to perform wireless communication between the center-side information processing device 10 of the communication center T and the vehicle-side information processing device 2 of the electric vehicle M. The communication device 11 performs transmission and reception of various signals with the vehicle-side information processing device 2 through the wireless communication network.

In a case where the positional information of the charging point is transmitted from the electric vehicle M, the position determination section 12 queries the map database D about the charging point. The position determination section 12 determines whether or not the charging point transmitted from the electric vehicle M is unregistered, based on a query result.

In a case where it is determined that the charging point transmitted from the electric vehicle M is unregistered, the position determination section 12 determines whether or not the charging point is located within the facility area registered in the map database D. If it is determined that the charging point is located within the facility area registered in the map database D, the position determination section 12 determines whether POI information of the facility area is present.

In a case where the position determination section 12 determines that the POI information of the facility area is present, the registration prohibition determination section 13 determines whether or not the charging point is prohibited from being registered based on the facility classification of the facility area included in the POI information.

Specifically, the registration prohibition determination section 13 determines whether the facility classification of the facility area is a public facility such as shopping malls or a private facility such as general houses, by using a map database D, a POI information database D1 and a POI information list that can be open to the public. In a case where the facility classification of the facility area is the private facility, the registration prohibition determination section 13 determines that the charging point is prohibited from being registered. In a case where the facility classification of the facility area is the public facility, the registration prohibition determination section 13 determines that the charging point is not prohibited from being registered. Incidentally, the POI information of the facility area may include in advance classification information as to whether the facility classification is a public facility or a private facility.

Based on the determination result of the position determination section 12 and the determination result of the registration prohibition determination section 13, the registration section 14 registers the charging point. In a case where the position determination section 12 determines that the charging point is not located within the facility area, the registration section 14 registers the charging point in the charging equipment information database D2. The registration section 14 registers the charging point on the map data of the map database D.

In a case where the position determination section 12 determines that the charging point has been registered, or in a case where the registration prohibition determination section 13 determines that the charging point is prohibited from being registered, the registration section 14 does not perform registration of the charging point.

If the position determination section 12 determines that POI information of the facility area at which the charging point is located is not present, the registration section 14 performs a reserve process without registering the charging point. The reserve process stores the charging point as a waiting charging point in the charging equipment information database D2. If the POI information of the facility area is newly registered from an individual research by a map data management company, it is determined whether this waiting charging point is to be registered again.

If the position determination section 12 determines that POI information of the facility area at which the charging point is located is present, and if the registration prohibition determination section 13 determines that the charging point is not prohibited from being registered, the registration section 14 respectively hierarchizes the POI information and the charging point into an upper level and a lower level and registers the hierarchized data.

Next, an operation of the aforementioned information processing device 1 will be described. First, the operation of the vehicle-side information processing device 2 relating to the charging point registration will be described.

Figure 3:
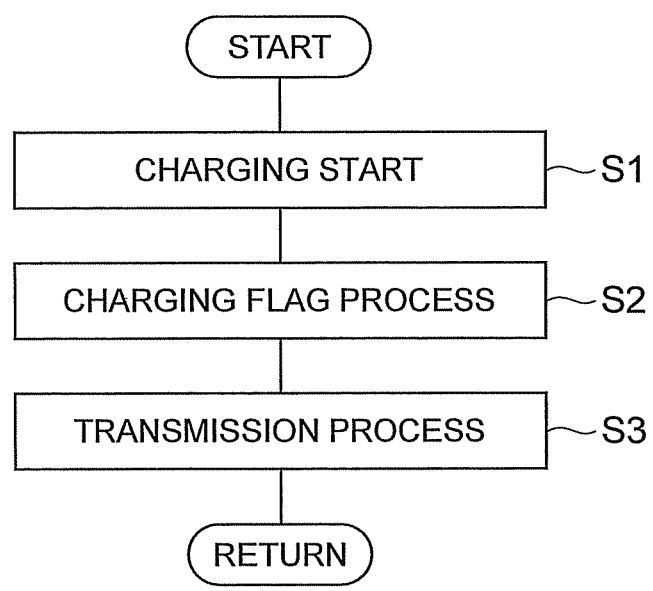
FIG. 3 is a flow chart showing the operation of a vehicle-side information processing device at the time of charging of a vehicle.

As shown in FIG. 3, if the plug of the charging equipment C is connected to a charging equipment connecting portion 4 and the charging of the electric vehicle M is carried out, the charging ECU 3 of the vehicle-side information processing device 2 recognizes the start of charging due to an increase in a charging amount of a battery (S1). If the start of charging is recognized, the charging ECU 3 performs a charging flag process of making a charging flag for charging point registration (S2). In a case where the charging flag process is performed, the charging ECU 3 performs a transmission process in which the communication device 6 transmits the current position of the electric vehicle M that is detected as the positional information of the charging point by the GPS receiving section 5, to the center-side information processing device 10 (S3).

Next, the operation of the center-side information processing device 10 relating to the charging point registration will be described.

Figure 4:
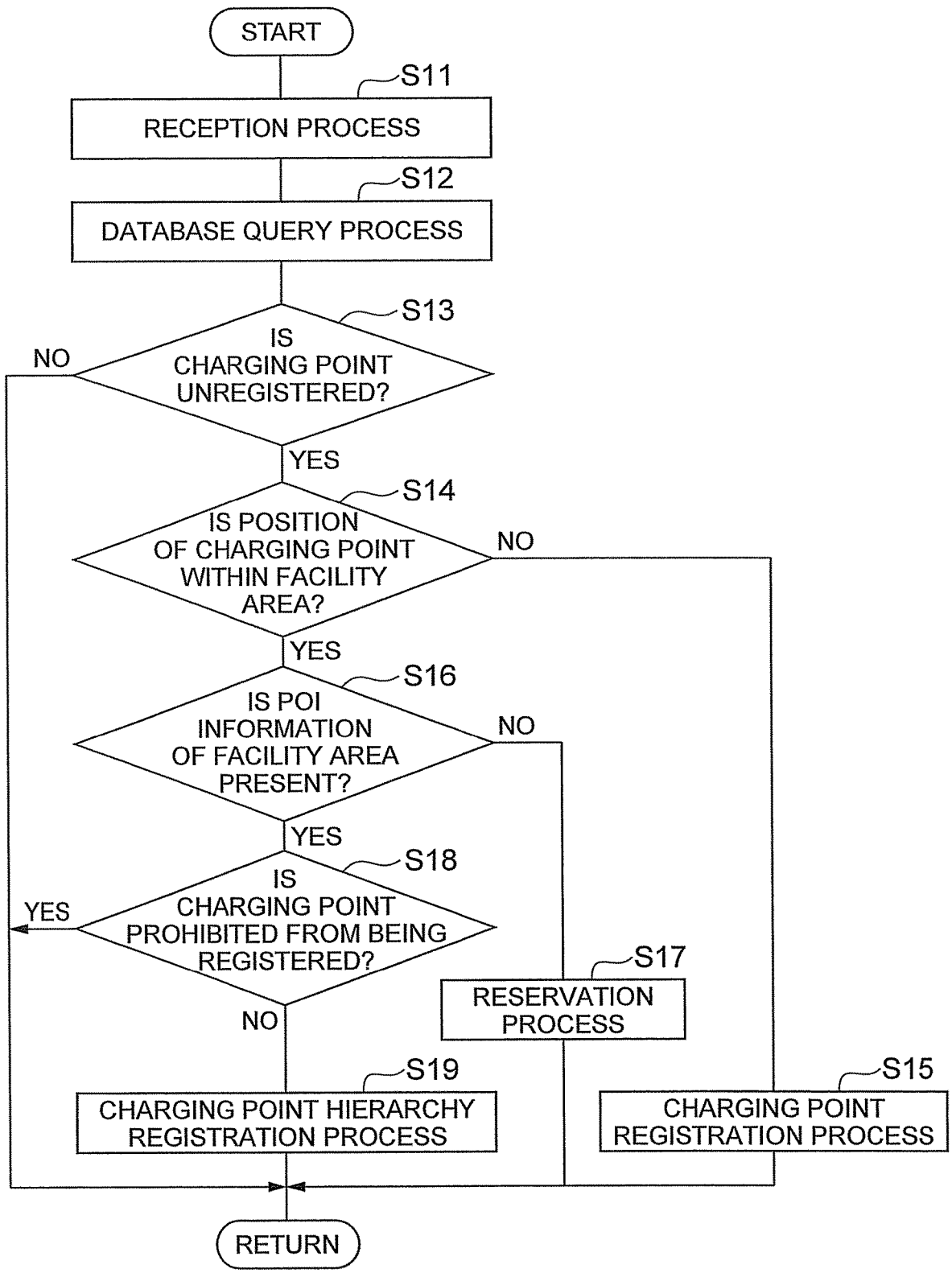
FIG. 4 is a flowchart illustrating the operation of a center-side information processing device in a case of receiving positional information of a charging point.

As shown in FIG. 4, the center-side information processing device 10 performs a reception process in which the communication device 11 receives the positional information of the charging point transmitted from the vehicle-side information processing device 2 (S11). Thereafter, the position determination section 12 of the center-side information processing device 10 performs a database query process of querying the map database D about the charging point (S12).

Then, the position determination section 12 determines whether or not the charging point transmitted from the electric vehicle M is unregistered, on the basis of the query result of the database query process (S13). In a case where it is determined that the charging point transmitted from the electric vehicle M is registered, the position determination section 12 terminates the operation.

In a case where it is determined that the charging point transmitted from the electric vehicle M is unregistered, the position determination section 12 determines whether or not the charging point is located within the facility area registered in the map database D (S14). In a case where the position determination section 12 determines that the charging point is located within the facility area registered in the map database D, the registration section 14 performs a charging point registration process of registering the charging point in the charging equipment information database D2 (S15). The registration section 14 registers the charging point on the map data in the map database D.

On the other hand, in a case where it is determined that the charging point is located within the facility area registered in the map database D, the position determination section 12 determines whether or not POI information of the facility area is present, based on the query result of the POI information database D1 (S16). In a case where the position determination section 12 determines that POI information of the facility area in which the charging point is located is not present, the registration section 14 performs a reserve process without registering the charging point (S17).

On the other hand, in a case where the position determination section 12 determines that POI information of the facility area in which the charging point is located is present, the registration prohibition determination section 13 determines whether or not the charging point is prohibited from being registered, based on the facility classification of the facility area (S18). In a case where the facility classification of the facility area is a private facility such as general houses or factories of companies, the registration prohibition determination section 13 determines that the charging point is prohibited from being registered. In a case where it is determined that the charging point is prohibited from being registered, the registration prohibition determination section 13 terminates the operation.

In a case where the registration prohibition determination section 13 determines that the charging point is not prohibited from being registered, the registration section 14 performs a hierarchy registration process that respectively hierarchizes the POI information of the facility area and the charging point into an upper level and a lower level, and registers the hierarchized data (S19).

Subsequently, the operation of the vehicle-side information processing device 2 in a case where the user sets the destination will be described.

Figure 5:
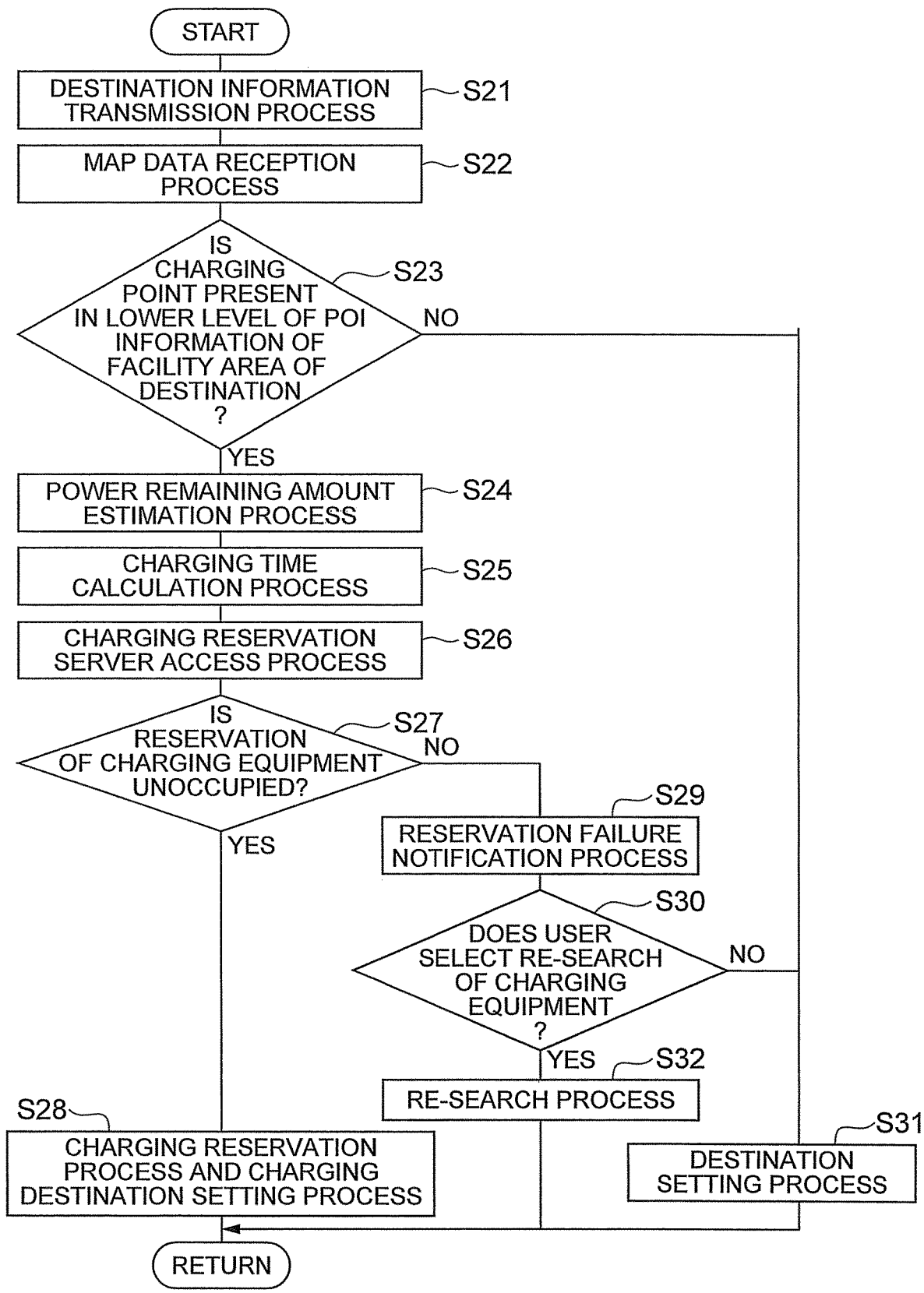
FIG. 5 is a flow chart showing the operation of the vehicle-side information processing device in a case where a user sets a destination.

As shown in FIG. 5, in a case where the destination of the electric vehicle M is input to the HMI 7 by the user, the charging ECU 3 of the vehicle-side information processing device 2 performs a destination information transmission process of transmitting the destination of the electric vehicle M and information about the current position to the center-side information processing device 10 (S21). Thereafter, the charging ECU 3 performs a map data receiving process of receiving map data including a route from the current position of the electric vehicle M to the destination by the transmission from the center-side information processing device 10 (S22).

Next, based on the received map data, the charging ECU 3 determines whether or not a charging point is present below the POI information of the facility area of the destination (S23). In a case where it is determined that the charging point is not present below the POI information, the charging ECU 3 proceeds to step S29.

In a case where it is determined that the charging point is present below the POI information, the charging ECU 3 performs a remaining power amount estimation process of estimating the remaining amount of power at the time of arriving at the destination (S24). Specifically, the charging ECU 3 calculates a destination arrival time and power consumed until arriving at the destination, based on the received map data. The charging ECU 3 estimates the remaining amount of power at the time of arriving at the destination, based on the destination arrival time and the consumed power that are calculated and the current charging amount of the battery. Thereafter, the charging ECU 3 performs a charging time calculation process that calculates a time required for charging the electric vehicle M, based on the estimated remaining amount of power at the time of arriving at the destination (S25).

In a case where the charging time calculation process is performed, the charging ECU 3 performs a charging reservation server access process of accessing a charging reservation server of the charging equipment of the charging point through wireless communication (S26). Thereafter, the charging ECU 3 determines whether reservation of the charging equipment is unoccupied within a predetermined time from the destination arrival time (S27). In a case where it is determined that the reservation of the charging facility is unoccupied within a predetermined time from the destination arrival time, the charging ECU 3 proceeds to step S28.

In step S28, the charging ECU 3 performs a charging reservation process of performing a reservation of the charging equipment. In addition, the charging ECU 3 performs a charging destination setting process of setting the charging point within the facility area as a destination.

On the other hand, in a case where it is determined that the reservation of the charging equipment is occupied within a predetermined time from the destination arrival time at step S27, the charging ECU 3 performs a reservation failure notification process in which a speaker and a display of the HMI 7 notify the user of the fact that the reservation of the charging equipment is unavailable (S29). After the reservation failure notification process, the charging ECU 3 performs an inquiry to the user as to whether or not to re-search the charging equipment (S30). In a case where the user does not select the re-search of the charging equipment, the charging ECU 3 proceeds to step S44-31.

In step S31, the charging ECU 3 performs a destination setting process of setting the destination that is input by the user as the destination of the electric vehicle M without change.

On the other hand, in a case where the user selects the re-search of the charging equipment, the charging ECU 3 performs the re-search process of searching a charging point that is available for reservation around the destination (S32). In the re-search process, if necessary, the charging ECU 3 acquires the map data around the destination by communication with the center-side information processing device 10 again. The charging ECU 3 sets the re-searched charging point as the destination.

According to the information processing device 1 relating to the present exemplary embodiment described above, in a case where the charging point in which electric vehicle M can be charged is located within the facility area such as shopping malls, the charging point in association with the positional information of the facility area is registered in the map database D, and thereby it is possible to reliably register in the map database D, information as to whether or not the charging point is within the facility area and to improve an accuracy of the positional information of the charging point.

Therefore, according to the information processing device 1, it is possible to register in the map database D, the position of the unregistered charging equipment fast and with high accuracy, and thus it is possible to increase usefulness of the map database D while efficiently compensating the map database D. Further, the information processing device 1 provides a navigation system with positional information of the charging point with high accuracy which is registered in the map database D, and thus it is possible to more accurately guide the user to the charging point and to improve the convenience of the user, even in parks and shopping malls having large areas.

Furthermore, according to the information processing device 1, since the charging point is hierarchized into a lower level of the positional information of the facility area, it is possible to facilitate the access to the charging point from the positional information of the facility area. Therefore, according to the information processing device 1, the access to the charging point by the user is facilitated, and thus it is possible to shorten the search time of the charging point.

Further, according to the information processing device 1, since the current position of the electric vehicle M at the time of charging is registered as the charging point in the map database D, it is possible to realize an efficient registration of the charging point.

Further, according to the information processing device 1, it is not appropriate to register in the shared map database, up to the positions of charging equipment for home use which is provided in a general house and charging equipment dedicated for employees which is provided in a company site. Therefore, it is determined whether or not the charging point is prohibited from being registered based on a facility classification of the facility area, and thus it is possible to prohibit the charging point from being registered in a case where the facility classification of the facility area is a house, or the like.

Further, according to the information processing device 1, since it is not appropriate to register in the shared map database the position of the charging equipment within the facility area in a case where the facility classification of the facility area is set to a private facility, it is determined that the charging point is prohibited from being registered in a case where the facility classification of the facility area is a private facility, and thus it is possible to prohibit the charging point within the private facility from being registered.

Further, since the charging point is hierarchized and registered below the POI information of the facility area in the information processing device 1, in a case where the user selects the facility area as the destination, it is possible to automatically search and reserve the charging point within the facility area.

The present invention is not limited to the embodiments described above.

For example, in the present invention, the mobile object that transmits the positional information of the charging point is not limited to the electric vehicles. Various mobile objects which perform charging in charging equipment such as a Plug-in Hybrid Vehicle (PHV) or a personal mobile equipment may transmit positional information of the charging point.

Further, an aspect is possible in which when it is determined whether the charging point is located within the facility area, the position determination section 12 of the center-side information processing device 10 inquires of the user of the electric vehicle M as to whether the charging point is located within the facility area. Thus, it is possible to register the positional information of the charging point in a state closer to the sense of the user.

Further, the map database D may not be necessarily a database provided in facilities such as the communication center T. For example, the map database D may be a database provided in the ECU of the vehicle. Further, the map database D may be a database provided in information terminals such as smart phones, notebook computers and tablet computers. In the map database D provided on the vehicle side, since the map database of the communication center T and the map database of the other vehicles are queried through wireless communication, the data about the charging point is updated.

INDUSTRIAL APPLICABILITY

The present invention is applicable to an information processing device which registers in a map database a charging point at the time of charging of the mobile object.

REFERENCE SIGNS LIST

1 . . . information processing device
2 . . . vehicle-side information processing device
3 . . . charging ECU
4 . . . charging equipment connecting portion
5 GPS receiving section
6 . . . communication device
7 . . . HMI (display unit)
10 . . . center-side information processing device
11 . . . communication device
12 . . . position determination section
13 . . . registration prohibition determination section (registration prohibition determination unit)
14 . . . registration section (registration unit)
A . . . facility area of shopping mall
Ap . . . positional information
C . . . charging equipment
Cp . . . charging point
D . . . map database
D1 . . . information database
D2 . . . charging equipment information database
Gs . . . GPS satellite
M . . . electric vehicle
T . . . communication center

The invention claimed is:

1. An information processing device which registers in a map database, a charging point in which charging equipment is located at the time of charging of a mobile object, comprising:
   a registration unit that, in a case where the charging point is located within a parking lot which is registered in the map database, registers in the map database at the time of charging of the mobile object, the charging point in association with positional information of the parking lot; and
   a registration prohibition determination unit that, if the charging point is located within the parking lot, determines whether or not the charging point is prohibited from being registered,
   wherein the registration unit respectively hierarchizes positional information of the parking lot and the charging point into an upper level and a lower level of the map database, and registers the hierarchized data in the map database.

2. The information processing device according to claim 1,
   wherein the registration unit registers a current position of the mobile object at the time of charging as the charging point in the map database.

3. The information processing device according to claim 1,
   wherein the registration prohibition determination unit determines that the charging point is prohibited from being registered if the parking lot is a private facility.

4. The information processing device according to claim 1, further comprising:
   a display unit that displays the positional information of the parking lot and the charging point that are registered in the map database,
   wherein the display unit simultaneously displays the positional information of the parking lot and the charging point associated with the positional information of the parking lot.

5. The information processing device according to claim 4,
   wherein the display unit displays the charging point associated with the positional information of the parking lot, in a case where the mobile object enters within the parking lot.

6. The information processing device according to claim 1, further comprising:
   a position determination unit to determine whether the charging point is located within the parking lot.

7. An information processing device which registers in a map database, a charging point in which charging equipment is located at the time of charging of a mobile object, comprising:
   a registration unit that, in a case where the charging point is located within a shopping mall which is registered in the map database, registers in the map database at the time of charging of the mobile object, the charging point in association with positional information of the shopping mall; and
   a registration prohibition determination unit that, if the charging point is located within the parking lot, determines whether or not the charging point is prohibited from being registered,
   wherein the registration unit respectively hierarchizes positional information of the shopping mall and the charging point into an upper level and a lower level of the map database, and registers the hierarchized data in the map database.

8. The information processing device according to claim 7, further comprising:
a position determination unit to determine whether the charging point is located within the shopping mall.

* * * * *